United States Patent [19]

Ternes et al.

[11] Patent Number: 5,635,125
[45] Date of Patent: Jun. 3, 1997

[54] METHOD FOR FORMING SIMULATED SHAKE SHINGLES

[75] Inventors: Thomas J. Ternes; Kimberly K. Ternes, both of Porter; Barry L. West, Yukon, all of Okla.

[73] Assignee: Re-New Wood, Incorporated, Wagoner, Okla.

[21] Appl. No.: 394,371

[22] Filed: Feb. 24, 1995

[51] Int. Cl.$^6$ .................................................. B29C 45/00
[52] U.S. Cl. ............. 264/328.18; 264/122; 264/DIG. 69
[58] Field of Search ......................... 264/328.18, 328.17, 264/DIG. 69, 122, 142, 349

[56] References Cited

U.S. PATENT DOCUMENTS

| | | | |
|---|---|---|---|
| 3,732,345 | 5/1973 | Amos et al. | 264/328.18 |
| 3,869,432 | 3/1975 | Gaylord | 526/272 |
| 3,943,677 | 3/1976 | Carothers | 52/309.4 |
| 3,958,069 | 5/1976 | Gaylord | 428/407 |
| 3,978,036 | 8/1976 | Pollard | 264/328.18 |
| 4,058,580 | 11/1977 | Flanders | 264/113 |
| 4,065,899 | 1/1978 | Kirkhuff | 52/309.8 |
| 4,290,248 | 9/1981 | Kemerer et al. | 52/309.16 |
| 4,376,144 | 3/1983 | Goettler | 428/36 |
| 5,001,005 | 3/1991 | Blanpied | 428/283 |
| 5,075,057 | 12/1991 | Hoedl | 264/115 |
| 5,088,910 | 2/1992 | Goforth et al. | 425/142 |
| 5,096,046 | 3/1992 | Goforth et al. | 198/604 |
| 5,217,800 | 6/1993 | Pentecost | 264/176.1 |
| 5,295,339 | 3/1994 | Manner | 52/518 |
| 5,441,801 | 8/1995 | Deaner et al. | 428/326 |

OTHER PUBLICATIONS

"Use of Eastern Hardwoods in Wood Fiber/Plastic Composites", Selke et al., Michigan State University (1988). no month.

"Compounding Wood Fibers and Recycled High Density Polyethylene Using a Twin–Screw Extruder", Selke et al., Michigan State University (1988). no month.

"Uses of Recycled Plastics in Composite Materials", Yam, Michigan State University. no month no year.

*Primary Examiner*—Jill L. Heitbrink
*Attorney, Agent, or Firm*—Head, Johnson & Kachigian

[57] ABSTRACT

An artificial shake type shingle includes of a molded composite of wood sawdust particles and ground-up recycled polyvinyl chloride (PVC) particles. The PVC particles are preferably formed from recycled water or garden hose, preferably those with reinforcing fibers therein, which composition helps to attain a strong building material product.

9 Claims, 3 Drawing Sheets

METHOD FOR FORMING SIMULATED SHAKE SHINGLES

BACKGROUND OF THE INVENTION

1. Field of the Invention

This invention relates to simulated roofing shingles and, more particularly, an improved interlocking simulated shingle construction made from recycled materials.

2. Description of the Related Art

For many years wood, shingle, shake, and ceramic or clay tile roofing has been used for the obvious purpose of sealing construction against rain and other weather elements. With shake shingles, in particular, their rough appearance forms pleasing patterns that give them considerable decorative appeal and have become the standard and required roofing material in many residential areas. However, in time wood, typically cedar, shakes deteriorate because of insect infestation, rotting, splitting, cracking, warping, thermal expansion and absorption of moisture, thereby decreasing their usefulness and decorative aspects. In addition, the cost of cedar shakes has substantially increased.

Various types of simulated shingles have been taught and patented as substitutes for wood shakes. In many cases, they do not provide the decorative appearance of shingle or shake configurations. For instance, composite materials of high or low density polyethylene, (HDPE) and (LDPE) and fibers respectfully, have been taught in U.S. Pat. Nos. 5,088,910 and 5,096,046. These teachings require extensive and uncommon equipment to create such synthetic wood products. The problems with wooden shake shingles, in addition to the problem of diminishing forest supply of cedar shakes, has led to other synthetic materials such as cement, asbestos composition, fiberglass, aluminum, galvanized steel and sophisticated expensive engineered thermoplastics. In many cases, weathering and age of these materials causes them to lose their simulated and decorative design concepts and become unsightly and discolored. Many commercially available products are paneled designs repeating the decorative surface over a large area, as for example, 4'×8', but still do not provide the simulated decorative effect demanded by home owners and constructions using shakes. One of the negative aspects of composites is that they fail to exhibit the reinforcing potential of wood fibers, and/or other fibers, and, in many cases, a poor adhesion between the fibers and the matrix, especially in the use HDPE.

Another facet of the times is the generation of solid and industrial waste. The creation of the United States Environmental Protection Agency (EPA) is concerned with the continued discarding of waste which is capable of but has not been recycled. Especially is this so with plastics. Production of plastics in the United States is increasing and is expected to and already has become a considerable part of the waste stream product. The use of recycled plastics as a part of composite materials is limited largely because of the competition with virgin resins and the public misconception that they are inferior if recycled. Beyond the concern of increasing waste plastic products from consumers is the waste from original manufacturers of plastic products. Many of these plastics such as PVC, being thermoplastic, can be remelted repeatedly. Approximately 40% of PVC produced is directed to pipe and tubing and growing 8% per year.

The term "shake" is commonly used and recognized in the roofing industry for wooden shake, shingles, slate or tile members.

SUMMARY OF THE INVENTION

It is an object of this invention to provide a composite consisting of wood fibers and polyvinyl chloride (PVC) plastics and, in particular, recycled PVC and sawdust which offers not only an opportunity to use an abundant waste natural resource in combination with other recycled materials as a means to alleviate the ongoing plastic disposal problem.

Another primary object of the invention is to provide an improved integrated and simulated shake shingle made up of a composite of PVC and sawdust, and which can be manufactured with commonly available machinery with minor modifications.

It is a further object of the invention to provide an improved shake shingle which incorporates sealed interlocking means between adjacent members to provide an effective seal between shingles along each course. The PVC for use in this invention can come from many sources including industrial scrap, although virgin material may be used or in combination therewith. Preferably, the invention proposes the use of commercially available PVC constructed water or 'garden type' hoses from consumer or manufacturer's waste. An example of such hose is found in U.S. Pat. No. 4,306,591. Such vinyl based resins can either be homopolymers, co-polymers or blends of each and may include fiber reinforcing such as braided or chopped glass fibers, nylon, carbon/graphite or aromatic polyamide (KEVLAR).

A yet further object of the invention is to provide a shake shingle, being of plastic composite, that is capable of withstanding weathering and physical abuse from hail without breaking or splintering.

The shake shingles of this invention can be made of varying widths and lengths and textured surfaces in order to provide non-repetitive simulated shake surfacing. In addition, the shake can be fastened using standard hammers, stapling equipment, and pneumatic nailers and formed with saws and shears as needed to install the roofing.

These and other objects of the invention are realized in a preferred embodiment as described in detail hereinafter.

In a preferred form, the integrated shake member is in the form of a flat rectangular body with its length being greater than its width and defined by a forward butt end, a head end, a top, a bottom, and longitudinal first and opposite sides running the length of the shingle. The shingle is molded from a composite of wood sawdust and recycled polyvinyl chloride particles, preferably ground-up PVC water hoses. The top of the shingle includes a forward exposed portion and a rearwood headlap portion with the exposed portion being tapered upwardly to said butt end and is molded with a texture to simulate the appearance of shake shingles or other external roof construction. The bottom of the shake has a plurality of ribs laid out in a diamond configuration or other configuration as stiffening ribs. The first longitudinal side is formed of a tenon that terminates short of the butt end. The second and opposite side includes a mortise to receive and join with the tenon of an adjacent shingle. Terminating the tenon short of the butt end permits the shakes to be staggered along each course without unsightly exposure of the tenon.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
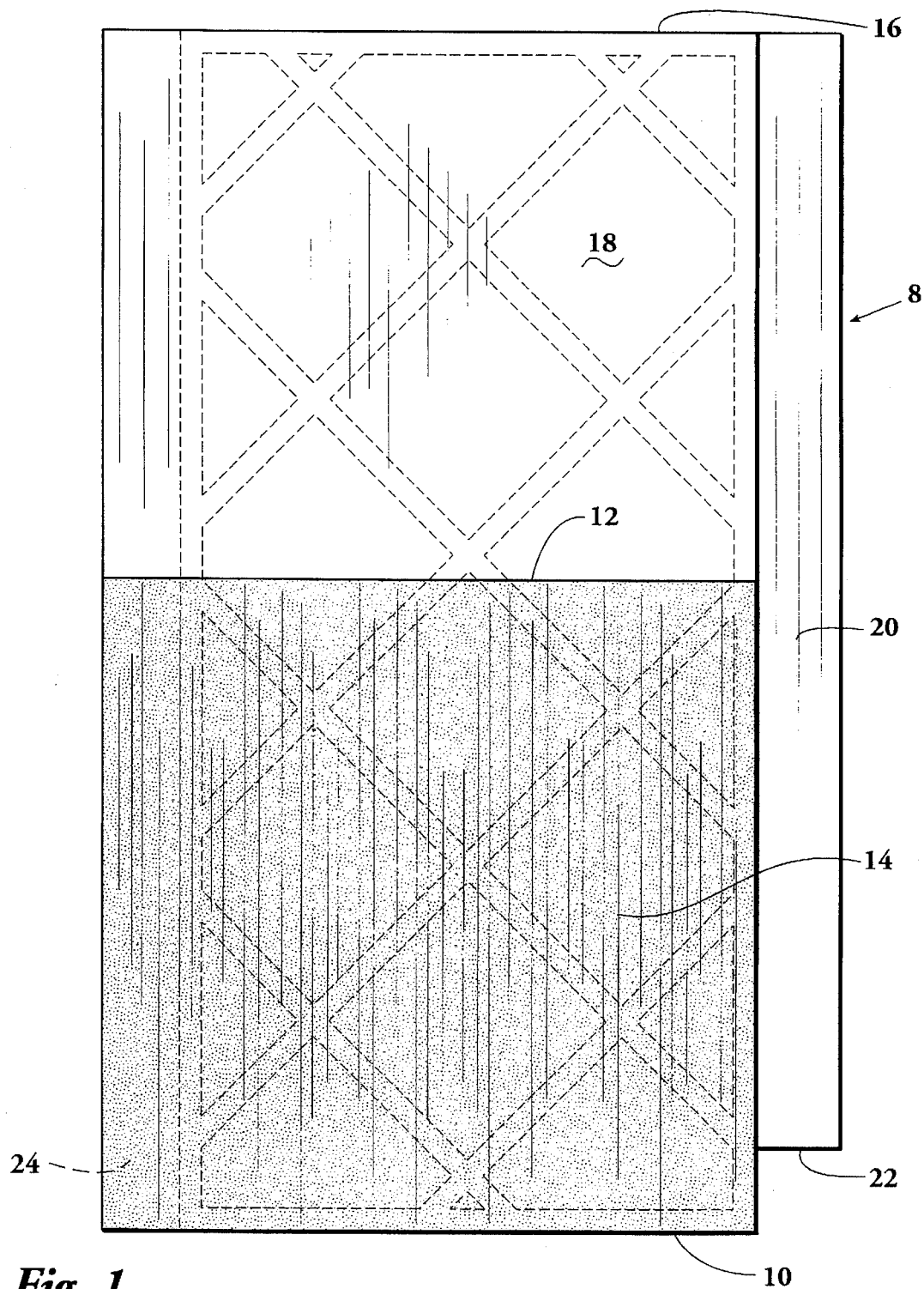
FIG. 1 is a top view of the shake type shingle of this invention.
Figure 3:
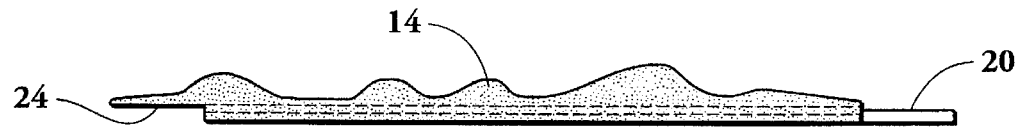
FIG. 3 is a butt end view of the shake of this invention.

Referring now to the drawings, the shake type shingle of this invention is shown generally as 8 being a relatively rectangular member with its length being greater than its width. For example, a typical simulated shake would have an overall width of about 13.5" (34 cm), while its length would be approximately 22" (56 cm). The simulated shake is defined by a butt end 10 which extends upwardly, and preferably more than half the length, e.g., 12" (30 cm) in the previous example, to a point 12 which defines the exposed portion 14 of the shake. Between the end of the exposed portion 14 at 12 and a head end 16 is a headlap portion 18 which is typically of a smooth configuration to receive the next course of shakes during the construction. The exposed portion of the shake is tapered upwardly, being thicker at the butt end 10 while smoothly tapering into the headlap portion 18 at the termination of the exposed portion at 12. The exposed portion 14 is molded with a ridged configuration as shown in FIG. 3 to provide the appearance of a wood split shake shingle. The thickness at the butt end 10 may, of course, vary but typically ⅜" (10 mm) thick is sufficient. Along the first longitudinal side of the shake is a tenon member 20 which extends along the length of the shake and terminating at 22 above the butt end 10. The provision of having the tenon terminate at 22 will allow, during the placement of a course of shakes, to be varied longitudinally with respect to adjacent shakes and thereby duplicate a random pattern as used with wooden shakes. On the other longitudinal side of the shake is a mortise or groove 24 formed to receive and interlock with the tenon of the adjacent shingle during placement on the roof.

Figures 2, 4:
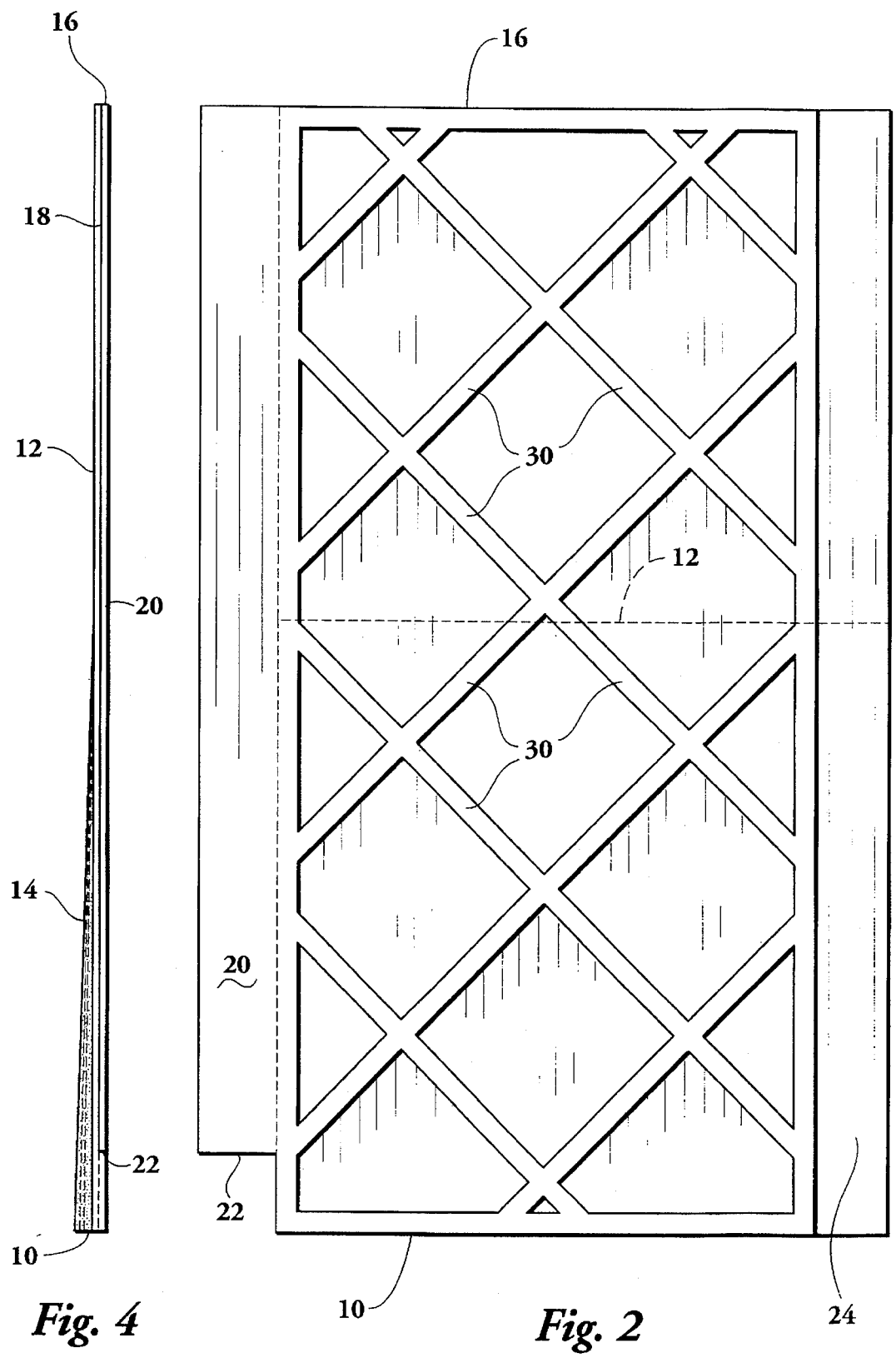
FIG. 2 is a rear side view.
FIG. 4 is a side elevational view of the shake.

Referring now to FIG. 2, the backside of the simulated shake may include a plurality of reinforcing ribs 30 which are interconnected forming a diamond pattern as shown herein. Although this is not to be restrictive as any form of ribbing may be utilized to provide strength to the shake.

The shake is composed of ground moldable polyvinyl chloride (PVC) as the matrix along with finely ground wood fiber or sawdust to which has been added ultraviolet protectants, colorants, and flame retardants.

Although many forms of polyvinyl chloride, homopolymers, and co-polymers or blends are capable of use within the broad concepts of the invention, it has been found that recycled PVC hose or tubing such as is sold commercially for domestic use, i.e., "garden hose" is particularly applicable and preferable. Waste from one manufacturer alone represents upwards of several hundred thousand pounds of unusable hose per month and comes in a variety of sizes, lengths, and color combinations, preferably, the PVC useful in this invention is of a Shore A 60 to 100 durometers in hardness. In many instances, such water hose construction includes a reinforcing strand which in many cases is formed of fiber bundles of yarns, or other textile composed of filaments of glass fibers, polyester, rayon, aramid, polyamide (Nylon) or other reinforcement materials. The reinforcement may be in the form of braid, knit, spiral, wrap or the like and have been found to enhance the shake product.

Figure 5:
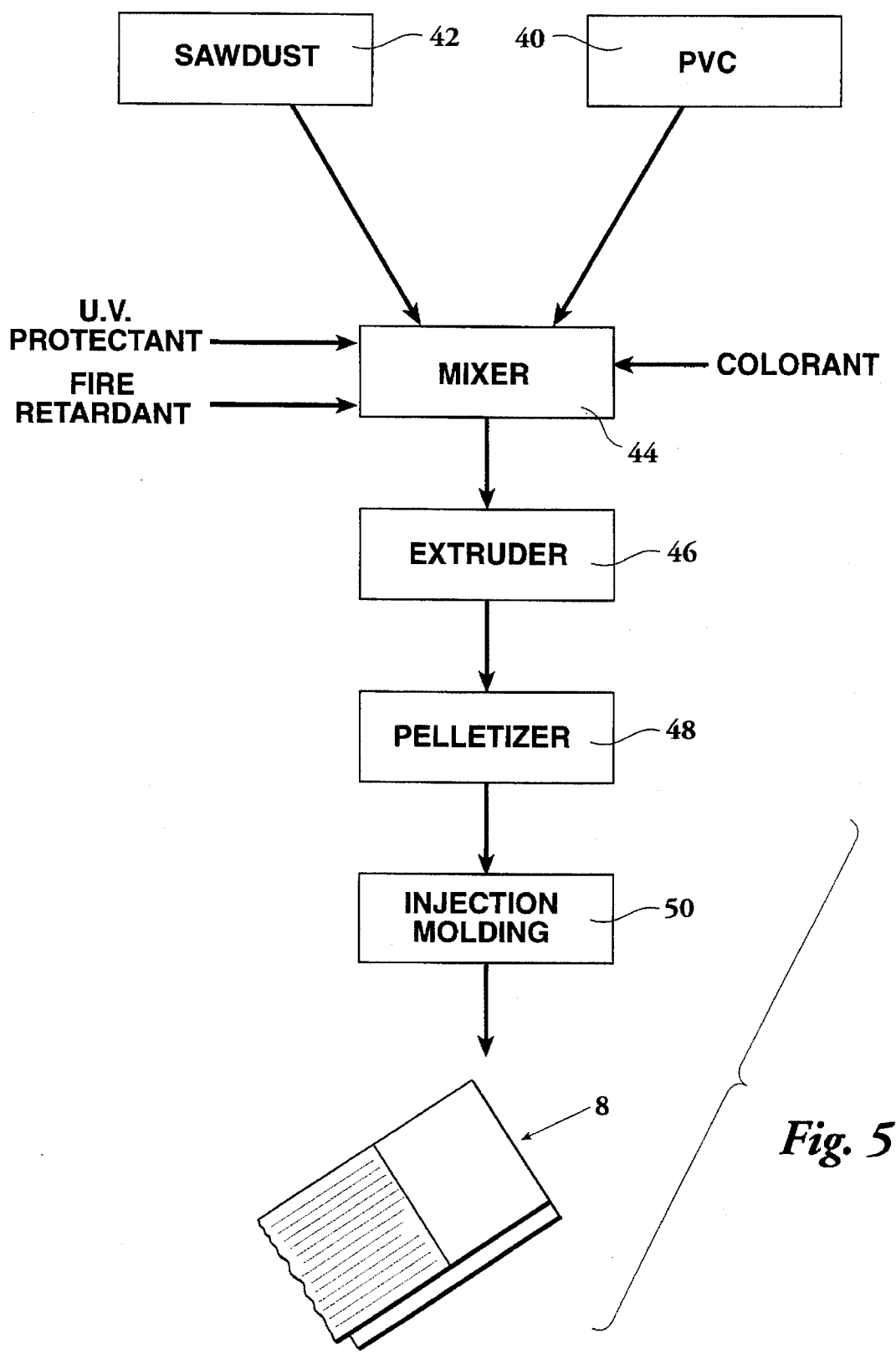
FIG. 5 is a schematic of one process for forming the shake.

Referring now to FIG. 5, the PVC material 40 is first ground to a size to pass through a ⅜" (10 mm) screen size.

The wood fibers 42 for use in the invention may be of hard and/or soft woods which are finely ground, typically scrap sawdust from a wood mill or the like which is already finely ground or at least of the size capable of passing through a ⅜" (10 mm) mesh screen. In many instances, the wood particles will have existing moisture content which may range of 40% to 60% relative humidity.

The ground up PVC 40 and wood particles 42 are then caused to pass into a mixer 44 of any type known in the art wherein ultraviolet (UV) inhibitors, flame retardant powders and colorant is added.

The flame retardant powder can be any of a variety or combinations from the group of Antimony Trioxide; Tribromophenoxy/Antimony Trioxide—3:1 ratio; Decabromodephenyl Oxide/Antimony Trioxide—3:1 ratio; Alumina Trihydrate; Boric Acid; Boric Acid 5 mole; Borax; and Zinc Borate. The retardants are effective within concentrations between 2% to 10% of the PVC.

The ultraviolet (UV) inhibitor may be mixtures of several types to protect not only the color of the resulting shake shingle but also protect the deterioration of the other particles within the mixture which may vary depending upon the make-up of the PVC. Typical and preferable UV powders are those sold by CIBA GIGY under the mark CHIMASSORB and TINUVIN 328. Both are powders and in a typical example are mixed in amounts of 0.5 to 0.7 percent of PVC of CHIMASSORB and 0.3 to 0.5 percent by weight of PVC of TINUVIN 328.

The colorant added to the mixing stage may vary as a function of the color of the resulting ground PVC material. The overall purpose being to obtain as a resulting mixture a shake which has all of the appearances of a wood shake. Because PVC hose comes in a variety of colors, e.g., clear, green, red, white and combinations, the colorant added in the mixing stage must compensate for these colors to achieve the desired result of a shake that simulates a wood shake. In one example, the colorant is added on the basis of a 4:1 let-down ratio, i.e., 4 pounds of colorant per 100 pounds of PVC. Typically, the colorant comes in the form of a powder which have been encapsulated in PVC.

The composite mixture in powder form is then submitted to an extruder 46, typically of the type manufactured by Akron as their Model 37524HXT, or those described in *Modern Plastics Encyclopedia*, 1989, pp. 7–9. In the operation of the extruder temperatures of the heated barrel and screw therein may reach between the range of 350° to 450° fahrenheit. The resulting melting and mixing of the composites from the heat, friction and compression forces the material through a die at the head end. However, the time of flight of the composite material therethrough is maintained short enough that it is incapable of melting the fibers, e.g., nylon fibers, found in the PVC hose. As a result, those fibers act as additional filler for strengthening the final resulting product. In addition, it has been found the extruder removes moisture from the system, particularly from the wood particles and, thus, further enhances and strengthens the bonding characteristic of the resulting product.

From the extruder 46, the material is then caused to pass to a pellitizer 48 which then creates the mixture into particles of ¼" to ⅜" (7–10 mm) or as otherwise sized for use in injection molding machine 50.

The injection molding machine is of an reciprocating/screw type, one such as manufactured by Lombard, being rated at 500 Ton (450 m.ton).

In accordance with the above-described process steps, the following example is set forth below to illustrate the specific process, starting materials, processing parameters and blends of PVC and sawdust materials.

EXAMPLE 20 lbs. (9 k) of PVC water hose ground smaller than 3/8" (10 mm) is mixed with 8.5 lbs. (3.8 k) of wood sawdust, also smaller than 3/8" (10 mm). The UV protectants CHEMSORB 944 FD in an amount of 0.06 lbs. (0.027 k) an 0.14 lbs. (0.036 k) of TINUVIN 328 are added to the mixer. Also 1 lb. (0.45 k) of a fire retardant Decabromdephnyl Oxide from Great Lakes Chemical, Inc. and 0.33 lbs. of Antimony Trioxide from Laurel Industries is added along with 1 lb. (0.45 k) of a colorant. The resultant mixture is then passed to the remaining process steps as shown in FIG. 5.

Although the invention has been described specifically to shake shingles, the process and compositions herein are also applicable to other synthetic wood building materials.

What is claimed is:

1. A method for forming simulated wood products comprising the steps of:
    grinding a waste fiber reinforced polymeric material to a size sufficient to pass a 3/8" (10 mm) screen size;
    providing wood particles of a size greater than 1/8" (3 mm) but small enough to pass a 3/8" (10 mm) screen size, said wood particles having a moisture content of 40–60% humidity;
    homogeneously mixing said ground fiber reinforced polymeric material and wood particles in a weight ratio within the range of 55:44 to 65:34 respectively, along with an ultraviolet protectant, a fire retardant, and a colorant to produce a mixed product;
    extruding said mixed product under temperature and pressure conditions such that said fiber of said fiber reinforced polymeric material will not melt, and any moisture in said wood particles is released to form an extruded product; and
    introducing said extruded product into an injection molding machine to form said simulated wood product.

2. The method of claim 1 wherein said hose material is of one color, and introducing said colorant such that when mixed therewith, the resultant color simulates the color of a natural wood product.

3. The method of claim 1 wherein said polymeric material is PVC.

4. The method of claim 1 wherein said simulated wood product is a shake shingle.

5. The method of claim 3 wherein said waste fiber reinforced polymeric material is hose material.

6. The method of claim 5 wherein said fiber is glass.

7. The method of claim 5 wherein said fiber is nylon.

8. The method of claim 5 wherein said fiber is carbon/graphite.

9. The method of claim 5 wherein said fiber is an aromatic polyamide.

* * * * *

UNITED STATES PATENT AND TRADEMARK OFFICE
CERTIFICATE OF CORRECTION

PATENT NO. : 5,635,125
DATED : June 3, 1997
INVENTOR(S) : Thomas J. Ternes, et al It is certified that error appears in the above-indentified patent and that said Letters Patent is hereby corrected as shown below:

Cover page, [57] ABSTRACT, line 1, delete "of";

Column 4, line 9, delete "relative"; and

Column 5, line 6, delete "smallerthan" and substitute therefore --smaller than--.

Column 6, line 11 (line 1 of claim 2), delete "hose" and substitute --polymeric-- therefor.

Signed and Sealed this

Fourteenth Day of October, 1997

Attest:

BRUCE LEHMAN

Attesting Officer    Commissioner of Patents and Trademarks